Nov. 13, 1923.
C. B. NORRIS
1,473,733
SCARFING MACHINE
Filed June 2, 1923
3 Sheets-Sheet 1
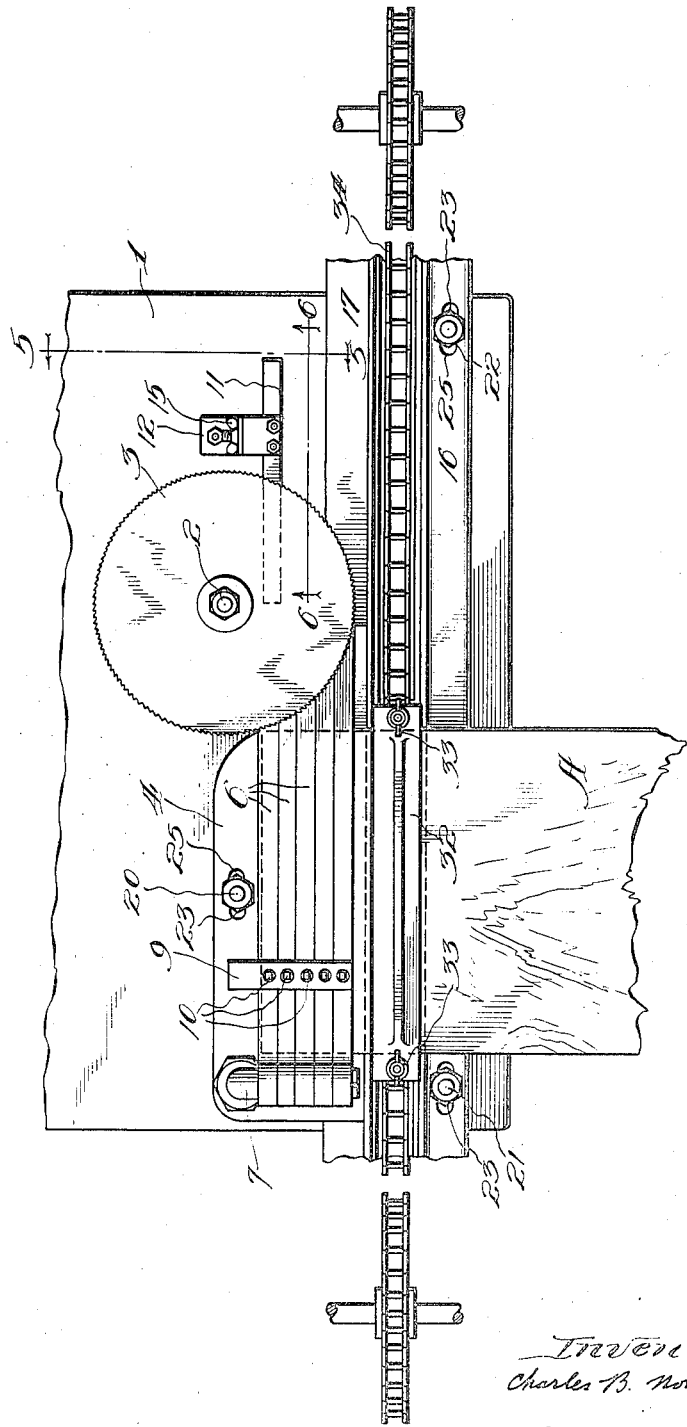

Nov. 13, 1923.
C. B. NORRIS
SCARFING MACHINE
Filed June 2, 1923      3 Sheets-Sheet 2
1,473,733
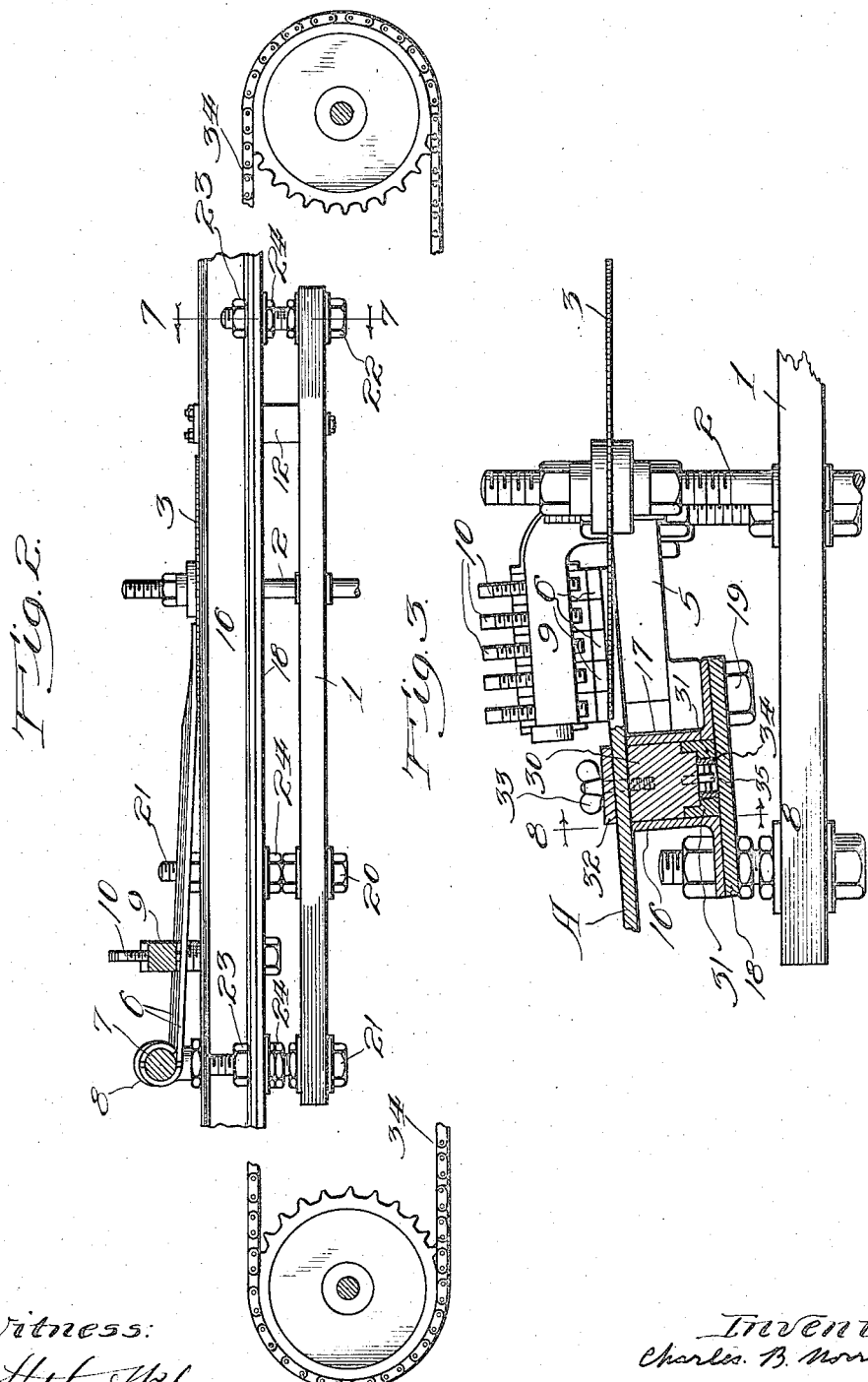

Nov. 13, 1923. 1,473,733
C. B. NORRIS
SCARFING MACHINE
Filed June 2, 1923   3 Sheets-Sheet 3
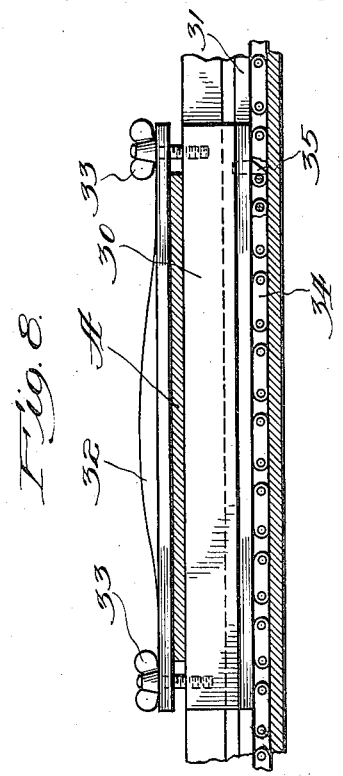
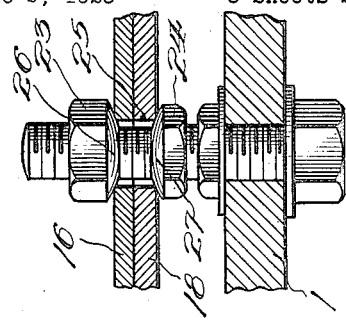
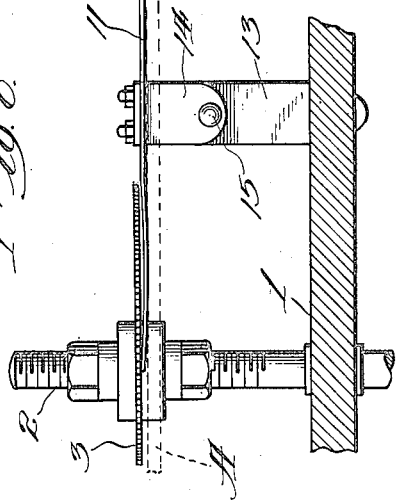
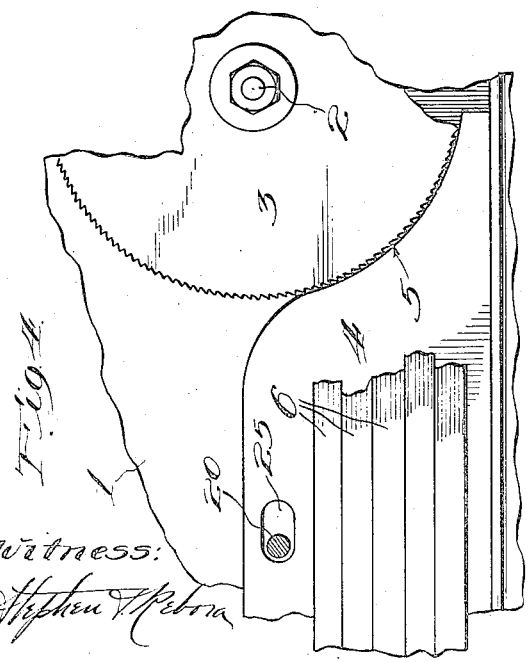
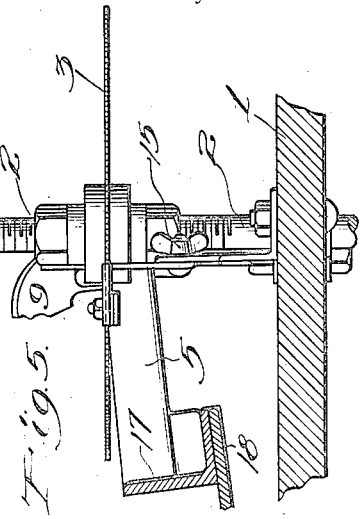
Inventor:
Charles B. Norris,
by Wm F Freudenreich, Atty.

Patented Nov. 13, 1923.

1,473,733

UNITED STATES PATENT OFFICE.

CHARLES B. NORRIS, OF GRAND RAPIDS, MICHIGAN, ASSIGNOR TO HASKELITE MANUFACTURING CORPORATION, A CORPORATION OF NEW YORK.

SCARFING MACHINE.

Application filed June 2, 1923. Serial No. 642,896.

*To all whom it may concern:*

Be it known that I, CHARLES B. NORRIS, a citizen of the United States, residing at Grand Rapids, county of Kent, State of Michigan, have invented a certain new and useful Improvement in Scarfing Machines, and declare the following to be a full, clear, and exact description of the same, such as will enable others skilled in the art to which it pertains to make and use the same, reference being had to the accompanying drawings, which form a part of this specification.

In order to join two panels of plywood to produce a larger panel, it is the practice to employ scarf joints of considerable width. The cutting of the overlapping portions which form the joint must be done accurately and very carefully, so that the joints shall glue properly, the surfaces of the completed product be smooth and continuous and the thickness of the completed product be uniform throughout. If the beveling of the edges be not done very accurately, the completed product will be imperfect and, if the thin or feather edge of either panel be broken or marred, the flat surfaces of the completed product will not be smooth and continuous at the joint.

The object of the present invention is to produce a simple and novel machine which will permit the beveling of the edges of panels, to be joined together, at any desired angle within limits, to be done economically, accurately, and in such a way that the thin feather edges will not be marred.

The various features of novelty whereby my invention is characterized will hereinafter be pointed out with particularity in the claims; but for a full understanding of my invention and of its objects and advantages reference may be had to the following detailed description taken in connection with the accompanying drawings, wherein:

Figure 1 is a top plan view of a machine arranged in accordance with my invention, parts being broken away, showing a short panel in the act of passing through the machine; Fig. 2 is a front elevation and Fig. 3 a view partly in end elevation and partly in cross section, of the machine shown in Fig. 1; Fig. 4 is a top plan view, on an enlarged scale, of a fragment of the machine, the free ends of the spring fingers that hold the work on the supporting table being broken away; Fig. 5 is a section taken approximately on line 5—5 of Fig. 1, on an enlarged scale, parts of the machine being broken away; Fig. 6 is a section taken approximately on line 6—6 of Fig. 1; Fig. 7 is a section, on an enlarged scale, taken approximately on line 7—7 of Fig. 2, illustrating a detail of one of the adjustable supports for the supporting table and track; and Fig. 8 is a section taken approximately on line 8—8 of Fig. 3, all of the parts of the machine except the supporting track and actuating chain being omitted.

Referring to the drawings, 1 represents a suitable support which may be a bench or other device having an elevated top supporting surface. Projecting upwardly from the support, between the ends thereof, is a rotatable shaft 2 on which is detachably mounted a suitable circular saw 3 of any desired diameter. Adjacent to the saw is a work-supporting table 4 which, as best shown in Fig. 4, has one end, as indicated at 5, shaped to lie close to and follow the contour of the periphery of the saw; the table thus serving to form a rigid support for the overlying work immediately adjacent to the line along which the cutting is taking place when the work is pushed along the table against the saw. Overlying the table are a series of strong parallel spring fingers 6 extending across the table in the direction of movement of the work, the fingers being supported in any suitable way at the ends farthest removed from the saw. In the arrangement shown, there is an L-shaped bracket 7 one arm of which rises vertically from the table and the other arm of which extends parallel with the surface of the table across the top of the same, and the ends of the spring fingers are bent around the horizontal member of the bracket, as indicated at 8. The fingers are made of such lengths and their free ends are so shaped that they follow the contour of the edge of the table adjacent to the saw. Consequently, when a panel is fed across the table underneath the spring fingers, the panel will be supported from underneath and will be pressed down by the spring fingers immediately adjacent to the points of contact between the panel and the saw. The purpose of employing a plurality of spring fingers is to permit each finger to act independently of the others so as to insure the flattening of the panel at the points where the cutting is taking place, in the event that the panel should be slightly warped or wavy, or vary slightly in thickness. Arranged above the spring fingers, near their supported ends, is a stationary cross bar 9. Screws 10, one for each spring finger, pass vertically through the bar 9, so that by adjusting the screws, the free ends of the fingers may be caused to engage the supporting table or the work between them and the table with any desired degree of pressure. the pressure of each finger being adjustable independently of the other fingers.

The work-supporting table is supported in any suitable way so that its upper surface lies in a plane forming a slight angle with the plane of the saw; all straight line elements, in the top of the table, extending in the direction of the feed of the work, being parallel with the plane of the saw. Therefore, when a panel such as indicated at A in Figs. 1 and 3, is fed along the table against the saw, a strip, wedge shaped in cross section, will be cut from the upper side of the panel along the margin thereof. If the parts are properly adjusted, the panel will be left with a marginal portion along one edge, which decreases gradually in thickness to a knife edge at said edge. Since the panel is firmly supported immediately adjacent to the line of contact with the saw, and since the spring fingers act to keep the panel perfectly flat in the vicinity of such line, the scarfing of the panel will be accurate and uniform throughout. As the panel passes out from underneath the saw at the opposite side of the saw from that at which the cutting is done, that is, past what may be termed the heel of the saw, the thin edge will be mutilated by coming in contact with the teeth of the saw, either because of a tendency of the mutilated marginal portion of the panel to curl up, or because the unsupported portion of the panel begins to chatter or vibrate, unless means be provided to prevent it. In order to avoid injury to the thin edge of the panel through contact with the heel of the saw, I have provided a thin blade lying close to the under side of the saw and adapted to enter between the sawed surface of the panel and the saw so as to prevent such surface from coming in contact with the heel of the saw. This blade, which may conveniently be a thin flat piece of steel 11, is conveniently mounted on a bracket 12 arranged adjacent to the saw at one side of the path of travel of the panel; the blade extending in the direction of travel of the panel and being of such a length that its inner end is about at the center of the chord of the saw overlying and paralleling the blade. The bracket is preferably made of a lower member 13 and an upper member 14 fastened together by a screw 15 which permits the blade to be adjusted. Due to the set given to the teeth in saws of this kind, the body portion of the saw is thinner than the width of the cut and therefore the sawed surface along the edge of the panel will be spaced apart from the under surface of the body of the saw a slight distance equal to the downward set that the teeth have. The inner end of the deflecting blade enters this space and deflects the cut edge of the panel downward, holding it away from the heel of the saw. The spring fingers hold the panel tightly enough upon the table so that this deflection of the panel does not affect the panel at the line upon which the cutting is being done.

The work must be properly guided and fed through the machine, and means should be provided for adjusting the table so as to vary the angle and therefore the width of the cut. These two ends may be accomplished in any suitable way. In the arrangement shown, there is connected to the front of the work-supporting table 4 a channel-shaped track which may conveniently be made of two angle irons 16 and 17, each having one of its flanges arranged vertically and its other flange arranged horizontally, the two vertical flanges being spaced apart from each other and the two horizontal flanges being directed outwardly from the vertical flanges. The horizontal flanges of the angle iron rest on an underlying plate 18 to which they are secured in any suitable manner. The vertical flange of the inner angle iron 17 bears against the front edge of the table 5, while the horizontal flange engages with the under side of the table. Bolts 19, passing upwardly through the plate 18, the horizontal flange of the angle iron 17, and into the table, fasten the track rigidly to the table. The table and the track may be supported from the bench or platform 1 upon three studs 20, 21 and 22 fixed to the bench or platform and rising vertically therefrom. The studs pass through suitable holes in the members which they support, and each is provided with nuts 23 and 24 engaging respectively with the upper and under surfaces of such members. The bolt holes are all alike and are all indicated by the reference character 25. The bolt holes are made larger than the studs, being elongated in the direction of the feed of the work, so as to permit the table and the track to be arranged at various angles and to be adjusted bodily from and toward the saw in order to adapt the machine for use in connection with saws of various sizes. The under faces of the nuts 23 and the upper faces of the nuts 24 are made cone shaped, as indicated at 26 and 27 in Fig. 7, so that the nuts will effectively clamp the member lying between the same, when the angle of said member is changed somewhat, thus permitting the angle of the table and its track to be varied within limits and permitting the table and the track to be rigidly held in any position into which they are adjusted.

The panel to be scarfed is clamped to a suitable elongated carriage that is adapted to slide within the channel-shaped track; the carriage being so designed that the laterally-projecting portion that overlies the table may lie flat on the table. In the arrangement shown, the carriage consists of a long thick bar 30 that fits between the vertical flanges of the angle irons, resting upon wooden strips 31 arranged in the two lower corners of the channel and spaced apart from each other. The panel is laid on the carriage, with an overhanging portion lying upon the supporting table and, after the panel has been properly adjusted, it is clamped to the carriage by means of a bar 32 extending across the top of the panel and connected at its ends, beyond the panel, to the carriage by means of screws 33 or other suitable means, for causing the panel to be firmly gripped between the bar and the carriage. The track forms a positive guide for the work, so that the latter will be fed in a straight line past the saw.

The carriage may be driven in any suitable way. In the arrangement shown, there is an endless chain 34, the upper run of which lies in the bottom of the channel between the strips 31. The chain has open links and the carriage is provided with a downwardly-projecting dog 35 adapted to enter the opening in any one of the links, so that when the chain is traveling in the proper direction, it will draw the carriage along the track and the panel past the saw.

While I have illustrated and described with particularity only a single form of my invention, and have referred to the use of my invention in connection with plywood panels, I do not desire to be limited to the particular details thus illustrated and described or to a machine adapted only for use in connection with a particular kind of panel; but intend to cover all forms and arrangements which come within the definitions of my invention constituting the appended claims. Furthermore, by the word "panel" I intend to cover work of any kind in connection with the sawing of which all or any of the features of my invention may be found to be useful.

I claim:

1. In a scarfing machine, a saw, a work-supporting table arranged beside the saw and having the work-supporting surface arranged at the proper angle to cause the saw to form the proper bevel at one edge of a panel moved along the table past the saw, the table having the end adjacent to the saw shaped to conform to the periphery of the saw, and means for holding on the table a panel to be sawed.

2. In a scarfing machine, a saw, a work-supporting table arranged beside the saw and having the work-supporting surface arranged at the proper angle to cause the saw to form the proper bevel at one edge of a panel moved along the table past the saw, the table having the end adjacent to the saw shaped to conform to the periphery of the saw, yieldable pressure means above the table adapted to engage a panel on the table and yieldingly press it against the table.

3. In a scarfing machine, a saw, a work-supporting table arranged beside the saw and having the work-supporting surface arranged at the proper angle to cause the saw to form the proper bevel at one edge of a panel moved along the table past the saw, the table having the end adjacent to the saw shaped to conform to the periphery of the saw, yieldable pressure means above the table constructed and arranged to engage and press down on a panel on the table along a line following the contour of the aforesaid end of the table.

4. In a scarfing machine, a saw, a work-supporting table arranged beside the saw and having the work-supporting surface arranged at the proper angle to cause the saw to form the proper bevel at one edge of a panel moved along the table past the saw, the table having the end adjacent to the saw shaped to conform to the periphery of the saw, a series of independent pressure devices above the table in position to engage and press down on a panel on the table along a line following the contour of the aforesaid end of the table.

5. In a scarfing machine, a saw, a work-supporting table arranged beside the saw and having the work-supporting surface arranged at the proper angle to cause the saw to form the proper bevel at one edge of a panel moved along the table past the saw, the table having the end adjacent to the saw shaped to conform to the periphery of the saw, a series of spring fingers lying above and extending lengthwise of the table, the free ends of the fingers lying near the saw and following the contour thereof.

6. In a scarfing machine, a saw, a work-supporting table arranged beside the saw and having the work-supporting surface arranged at the proper angle to cause the saw to form the proper bevel at one edge of a panel moved along the table past the saw, the table having the end adjacent to the saw shaped to conform to the periphery of the saw, and means above the table for flattening a panel on the latter in proximity to the line along which the saw is cutting when the panel is being moved past the saw.

7. In a scarfing machine, a saw, a work-supporting table arranged beside the saw and having the work-supporting surface arranged at the proper angle to cause the saw to form the proper bevel at one edge of a panel moved along the table past the saw, the table having the end adjacent to the saw shaped to conform to the periphery of the saw, means for adjusting the angle of the table relatively to the saw, and means for holding on the table a panel to be sawed.

8. In a scarfing machine, a saw, a work-supporting table arranged beside the saw and having the work-supporting surface arranged at the proper angle to cause the saw to form the proper bevel at one edge of a panel moved along the table past the saw, the table having the end adjacent to the saw shaped to conform to the periphery of the saw, means for adjusting the table from and toward the axis of the saw and to vary the angle of the top thereof relatively to the saw, and means for holding on the table a panel to be sawed.

9. In a scarfing machine, a saw, a work-supporting table arranged beside the saw and having the work-supporting surface arranged at the proper angle to cause the saw to form the proper bevel at one edge of a panel moved along the table past the saw, the table having the end adjacent to the saw shaped to conform to the periphery of the saw, means for holding on the table a panel to be sawed, and means for feeding a panel along the table past the saw.

10. In a scarfing machine, a saw, a work-supporting table arranged beside the saw and having the work-supporting surface arranged at the proper angle to cause the saw to form the proper bevel at one edge of a panel moved along the table past the saw, the table having the end adjacent to the saw shaped to conform to the periphery of the saw, means for holding on the table a panel to be sawed, and combined guiding and feeding means for moving a panel across the table and past the saw in a straight line.

11. In a scarfing machine, a saw, a work-supporting table arranged beside the saw and having the work-supporting surface arranged at the proper angle to cause the saw to form the proper bevel at one edge of a panel moved along the table past the saw, and means for engaging with the top of the panel before it passes out from under the saw to prevent the panel from engaging with the heel of the saw.

12. In a scarfing machine, a saw, a work-supporting table arranged beside the saw and having the work-supporting surface arranged at the proper angle to cause the saw to form the proper bevel at one edge of a panel moved along the table past the saw, and a thin blade-like flat-lying member extending out from underneath and in proximity to the body thereof past the heel of the saw in position to overlie the sawed surface of the panel and prevent it from coming in contact with the heel of the saw as it passes out from under the saw.

13. In a scarfing machine, a circular saw, and a work-support arranged adjacent to and following the contour of the periphery of the saw, said support comprising two members yieldingly pressed together and adapted yieldingly to grip the work between them, and said support being arranged to hold the work fed through the same to the saw at the proper angle to the plane of the saw to cause the saw to form a bevel on the work.

14. In a scarfing machine, a circular saw, and two work-supporting elements arranged adjacent to and following the contour of the periphery of the saw along the line on which the cutting is done when a piece of work is fed between said elements against said saw, one of said elements consisting of a series of individually-yieldable parts.

15. In a scarfing machine, a circular saw, and two work-supporting elements arranged adjacent to and following the contour of the periphery of the saw along the line on which the cutting is done when a piece of work is fed between said elements against said saw, one of said elements consisting of a series of individually-yieldable parts, and said elements being positioned to hold the work at the proper angle to the plane of the saw to cause the latter to form a bevel on the work.

In testimony whereof I sign this specification.

CHARLES B. NORRIS.